United States Patent [19] [11] 3,927,263
Fretwell [45] Dec. 16, 1975

[54] PROGRAMMABLE FREQUENCY-SHIFT-KEYING ACOUSTIC TRANSMITTER TO TRANSMIT REPEATED BIT DIGITAL MESSAGE VIA TELEPHONE LINES

[75] Inventor: Richard D. Fretwell, Grove City, Ohio

[73] Assignee: MI², Columbus, Ohio

[22] Filed: Mar. 21, 1973

[21] Appl. No.: 343,207

[52] U.S. Cl. .............................................. 179/2 DP
[51] Int. Cl.² ........................................ H04M 11/06
[58] Field of Search ......... 179/2 DP, 90 B, 6 E, 5.5, 179/2 A; 178/66 R, 17 R, 17 C; 340/365 R

[56] References Cited

UNITED STATES PATENTS

| | | | |
|---|---|---|---|
| 3,361,875 | 1/1968 | Banfalvi | 340/365 |
| 3,624,292 | 11/1971 | Guzak | 179/2 DP |
| 3,647,972 | 3/1972 | Glover | 179/2 DP |
| 3,700,814 | 10/1972 | Spraker | 179/2 DP |
| 3,746,793 | 7/1973 | Sachs | 179/2 DP |

*Primary Examiner*—Kathleen H. Claffy
*Assistant Examiner*—Thomas D'Amico
*Attorney, Agent, or Firm*—Cennamo Kremblas & Foster

[57] ABSTRACT

A programmable portable frequency-shift-keying acoustic transmitter operable to transmit a repeated bit digital message over ordinary telephone lines into a digital computer using audio acoustic FSK transmission techniques. The digital message is repeated for a fixed period of time and then terminated. Logic circuitry is provided in a controlled manner to permit reprogramming of the required message. Additional bits are selected by addition or deletion of circuitry whereas other bits are fixed. The system is particularly adaptable to home subscriber television programming.

9 Claims, 8 Drawing Figures

PROGRAMMABLE FREQUENCY-SHIFT-KEYING ACOUSTIC TRANSMITTER TO TRANSMIT REPEATED BIT DIGITAL MESSAGE VIA TELEPHONE LINES

BACKGROUND

In recent years the use of communication lines has been extended considerably to include peripheral equipment already in commercial use. One very important advance made to extend the use of communication lines has been the acoustic coupler. This coupler is a direct communication link between the sender and the standard use equipment.

In view of the sophistication of the apparatus and circuitry utilized in data communication the equipment is relatively large and costly. To further extend the data communication a programmable transmitter of relatively small size and inexpensive to manufacture is needed. One such use of particular significance is data transmission into the home - movies and special programs to cable television subscribers. It is to be appreciated that any apparatus or equipment for mass usage must be simple, reliable and extremely rugged. The selector must not be more than a push-button.

Particularly one such use of home subscriber cable television would be the "home programmer" unit for programming special channels inserted in the home set. The special channels are in addition to the normal cable television one channel. The special programs may include in addition to first run movies, live theater, concerts, sporting events, college courses, shopping services, and many others. To select a program the subscriber merely pushes a button and a second button to set the time for the program. The home telephone is dialed a special number and then placed on the aforementioned coupler to link the home unit to a centralized computer. The computer then performs the function of activating the appropriate program at the appropriate time.

SUMMARY OF INVENTION

The present invention is a programmable hand-held frequency-shift-keying transmitter particularly adaptable to the aforementioned home subscriber television programs. It is small in size and battery operated. In operation the conventional telephone handset is lifted and the desired number is dialed. The computer acknowledges the call by a recognizable answer-back tone. With the depressing of the on/off switch the apparatus and circuitry of the invention transmits a repeated 60 bit message for approximately 6 seconds and then returns to silence and the call is completed. The bits 2–7 of the unit are controlled by six integral pushbutton switches to allow for re-programming of the required message. The bits 0, 1, 8–49 are selected by addition or deletion of diodes within the circuit. The bits 50–59 are fixed at logic 1.

OBJECTS

Accordingly, it is a principal object of the present invention to provide a new, simplified, programmable transmitter.

A further object of the present invention is to provide a programmable transmitter for transmitting to a digital computer using audio/acoustic FSK transmission techniques.

Another object of the invention is to provide such a programmable transmitter that is hand-held, extremely rugged, and significantly reliable in operation.

Another object of the invention is to provide such a programmable transmitter that has a minimum number of push-buttons for home use.

Other objects and features of the present invention will become apparent from the following detailed description when taken in conjunction with the drawings in which:

DETAILED DESCRIPTION OF DRAWINGS

Figure 1:
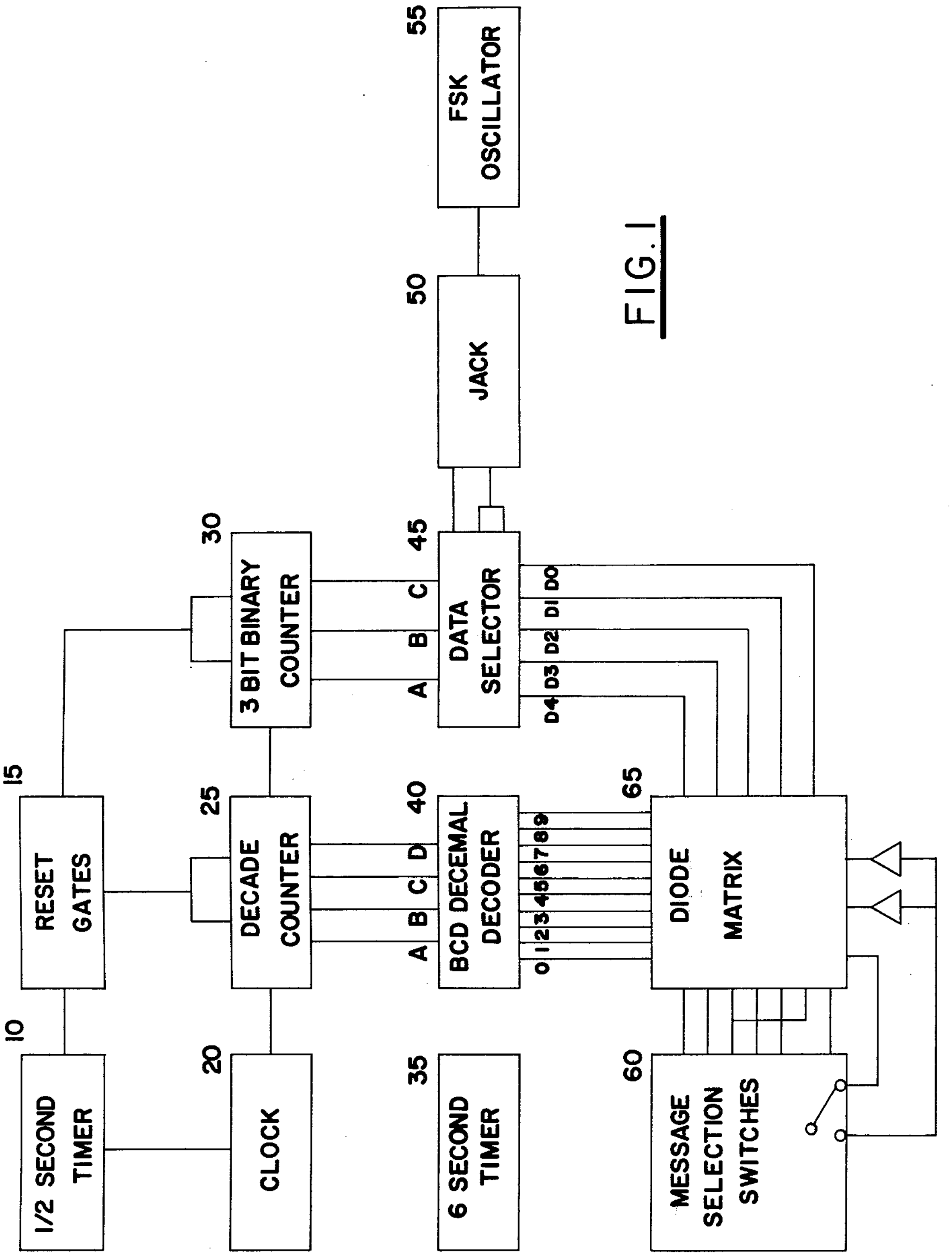
FIG. 1 is a schematic block circuit illustration of the programmable transmitter of the present invention.

Referring now to the drawings, and particularly to the block schematic diagram of FIG. 1, there is illustrated the programmable FSK acoustic transmitter of the present invention.

In theory of operation upon actuating an on/off switch the ½ second timer 10 causes the transmitter unit to send — via acoustic coupler — over the communication lines a ½ second steady mark frequency signal prior to permitting the 60 bit message. This is to allow proper connection and to establish the communication lines by disabling the echo suppressor on the telephone line. This is known as the "handshake sequence."At the termination of the ½ second the circuit enables the system to begin transmitting the repeated 60 bit message.

Also when the on/off switch is turned on the 6 second timer 35 applies power to the overall system for a maximum of 6 seconds as set forth hereinafter relative to FIG. 4. At the termination of the 6 second period power is turned off.

The clock 20 provides to the system the 100 bps bit rate (baud rate) required for the system. The output the clock 20 is held at 0 volts d.c. by a reset input until the completion of the ½ second timer period.

The decade counter 25 is operable in the sequence shown in the table A of the Appendix. The logic 1 represents +5 volts d.c. and the logic 0 represents 0 volts d.c. The table as shown is for a reset input at 0 volts d.c. When the reset is at +5 volts d.c. the counter is held at the count 0.

The BCD Decimal Decoder 40 is operable in the sequence shown in the table B of the Appendix. Each time the 60 bit message is transmitted in the 6 second period the decade counter in the BCD Decimal Decoder is cycled through the table as shown 6 times. It is noted that only BCD counts 0–9 are shown since its input is derived from the decade counter 25.

The 3 bit binary counter 30 is operable in the sequence shown in table C of the Appendix C. This counter is incremented one count each time the decade counter 25 completes a count of 10 clock pulses. The 3-bit binary counter counts through the count of 5 during each transmission of the 60 bit message.

The reset gates 15 resets the system at the completion of sending the 60 bit message and conditions the circuit to repeat the message. As pointed out above the message is repeated until the 6 second timer times out and the battery power is removed from the system. The message is repeated approximately 10 times during the 6 second time period.

The data selector 45 is operable in the sequence shown in table O of the Appendix. The logic 1 again is equal to +5 volts d.c. whereas the O is 0 volts d.c. and the X denotes that state may be either logic 1 or logic 0.

The FSK oscillator circuit 55 derives the acoustic tone that is transmitted to the telephone handset. This circuit comprises a two-pole active filter stage with an output frequency 180° out of phase with the input frequency. The filter output is limited, inverted and fed back to the input to cause the circuit to oscillate.

The diode matrix 65 determines the bit pattern within the 60 bit message. With reference to the Appendix tables A, B, C, and D it is seen that only one vertical column of diodes within the matrix is grounded during each count of clock 20. Also it can be seen that only one horizontal row of diodes is connected to the data selector 45 during each 10 clock 20 pulses. The sequence of the matrix is set forth below together with FIG. 6.

The message selection switches 60 controls bits 2–7 of the 60 bit message by six pushbutton switches located for easy access on the front panel of the unit. The switch sequence is set forth below together with FIG. 6 and table E of the Appendix.

Figure 3:
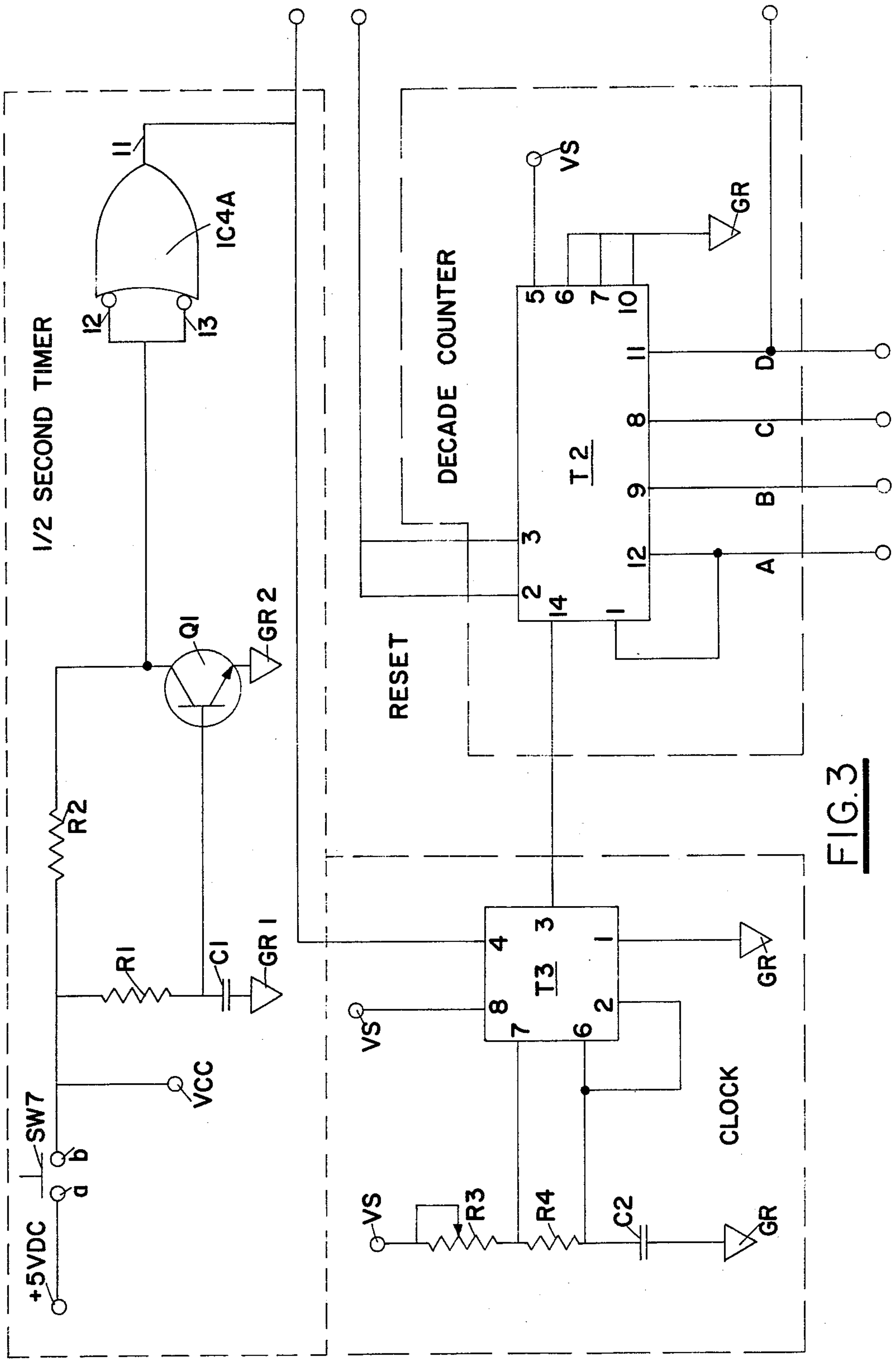
FIG. 3 is a schematic illustration of the ½ second timer 10, the clock 20, and the decade counter 25 of FIG. 1.

The operation of the block schematic circuit can now be more fully appreciated by reference to the specific circuitry comprising the various circuits. With particular reference now to FIG. 3 there is shown the circuitry for the ½ second timer (10 of FIG. 1). In operation this circuit forces the unit to send one-half second of steady mark frequency before sending the 60 bit message. This is to allow for proper connection to the receiving station. The frequency in this embodiment is 1270 hz.

Specifically upon depressing switch SW-7 across contacts *a* and *b* 5 volts d.c. is applied to the timer. The capacitor C-1 charges from 0 volts d.c. to 1.2 volts d.c. in approximately ½ second. The resistor R-1 controls the rate of charge. The 1.2 volts d.c. is sufficient to cause transistor Q-1 to conduct. This causes the voltage at its collector to drop from +5 volts d.c. to 0.6 volts d.c. The output pin 11 of the positive nand gate 1C-4 switches from 0 volts d.c. to +5 volts d.c. This enables the system to begin transmitting the 60 bit message.

Figure 4:
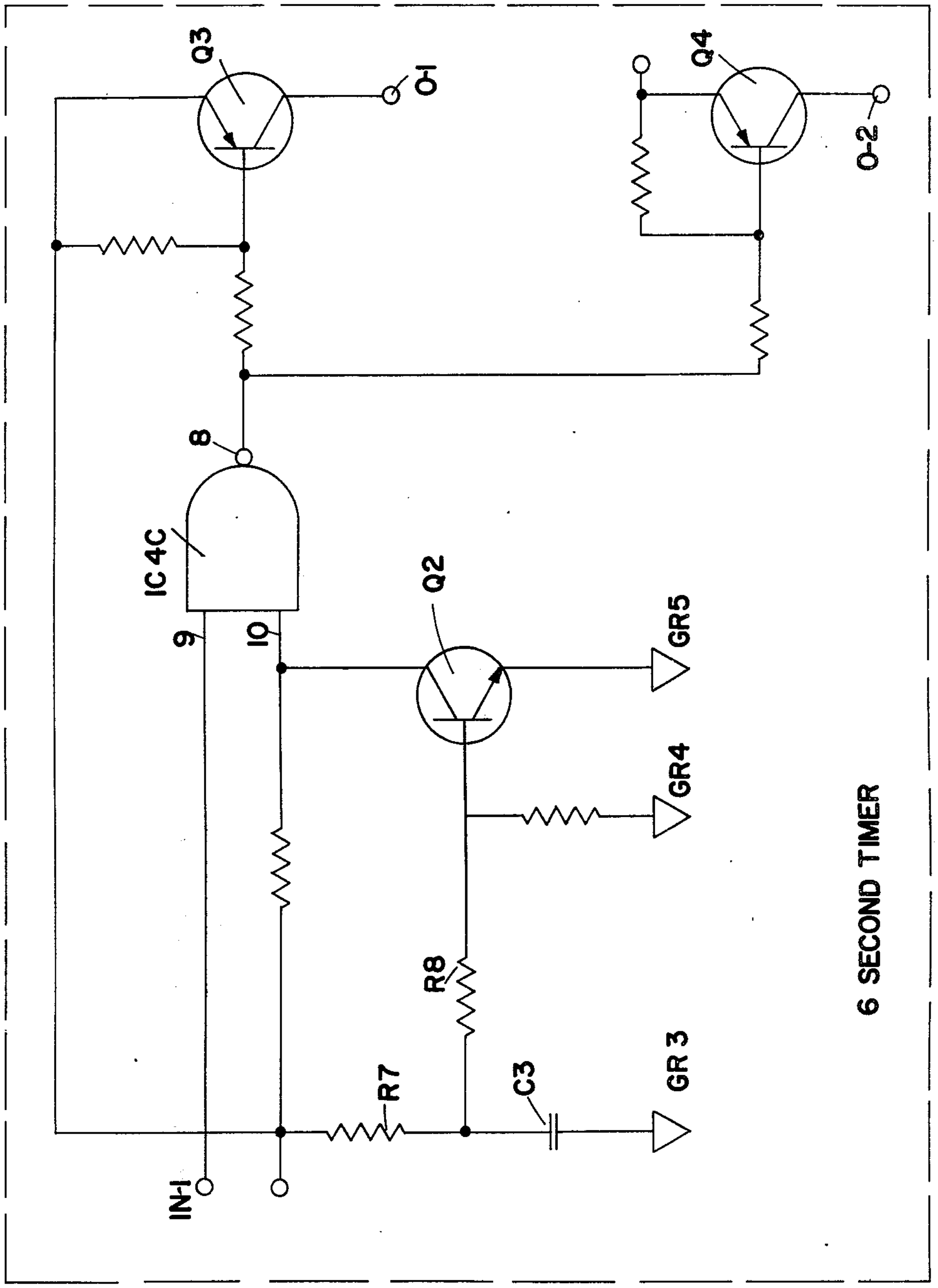
FIG. 4 is a schematic illustration of the 6 second timer 35 of FIG. 1.

Referring now to FIG. 4 there is shown the schematic circuit details of the 6 second timer (35 of FIG. 1). The function of this circuit is to apply the +5 volts d.c. and the +2.5 volts d.c. to the system for a maximum period of 6 seconds. In that the transmitter of the preferred embodiment is a portable unit, and hence utilizes battery power, the circuit removes the power from the system at the end of the 6 second period. This is of course, to preserve the battery life.

With SW-7 (FIG. 3) depressed +5 volts d.c. and +2.5 volts d.c. is applied; again referring to FIG. 4 to the 6 second timing circuit input IN-1. Capacitor C-3 charges from 0 volts to +3 volts d.c. in 6 seconds. Again resistor R-7 determines the charge rate. This voltage is sufficient to cause transistor Q-2 to conduct to thereby switch its collector voltage from +5 volts d.c. to zero volts. Prior to the timing out, both inputs 9 and 10 to the positive nand gate 1C 4C are at +5 volts d.c. This results in its output, at pin 8, being 0 volts d.c. This in turn causes transistors Q3 and Q4 to be turned on. Transistor Q3 supplies at its output 0–1, +5 volts d.c. and transistor Q-4, +2.5 volts d.c.

When transistor Q-2 turns on, as aforesaid, at the end of the 6 second period, the output pin 8 of 1C 4C switches to +5 volts d.c. and hence turns off transistors Q3 and Q4. This removes power from the system.

Referring again to FIG. 3 there is illustrated in detail the circuit schematic of the system clock (20 of FIG. 1). The clock provides the 100 bps bit rate (baud rate) required for the system. The timer T-3, resistors R-4 resistor R-3 and capacitor C-2 form a stable multivibrator circuit with an output frequency in this embodiment of 100 hz. With +5 volts d.c. applied at terminals VS capacitor C-2 charges through resistors R-3 and R-4 and discharges through resistor R-4 (only). When the voltage on capacitor C-2 reaches 3.3 volts d.c., pin 7 of T-3 switches to zero volts d.c. from an open circuit. Capacitor C-2 then discharges to +1.5 volts d.c. at which time pin 7 again switches back to an open circuit. The cycle is repeated. The frequency of operation is given by $$F = \frac{1.46}{[(R-3) + 2(R4)]\,(C2)}$$

During the charging one-half cycle the output at pin 3 of T-3 is at +5 volts d.c. During the discharge one-half cycle the output of T-3 pin 3 is held at 0 volts d.c. The output of the clock at pin 3 is held at zero volts by the reset input on pin 4 until the completion of the ½ second timer.

Figure 2:
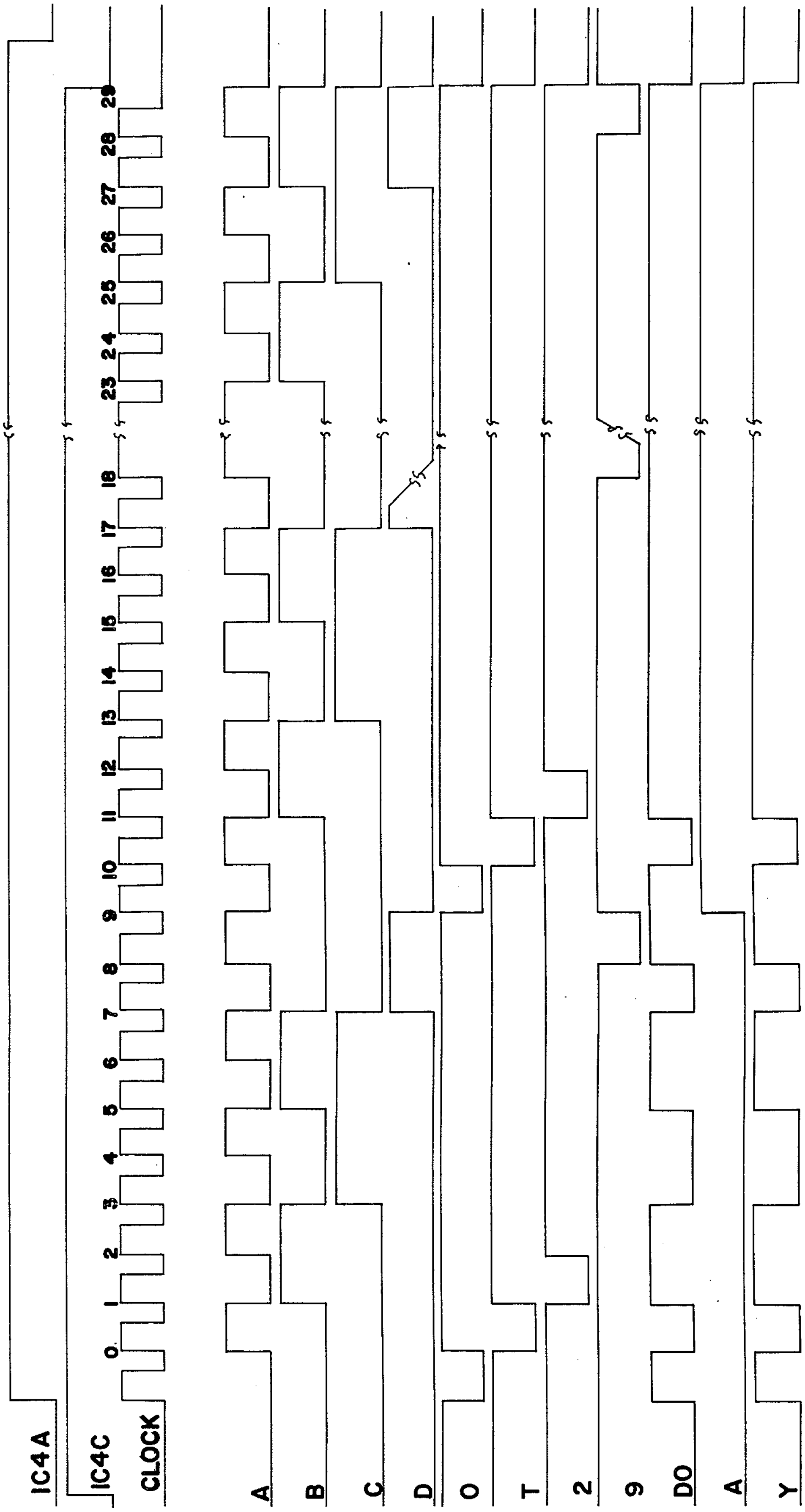
FIG. 2 are a series of waveforms illustrated for the purpose of understanding the circuit of FIG. 1.

The output at pin 3 of T-3 is shown in the third from the top waveform in FIG. 2.

The sequence logic of the input from the system clock and the outputs at pins 12, 9, 8, 11 of timer T-2 is shown in the table A as outputs A B C D. The waveforms showing their respective time periods are shown in FIG. 2.

The 60 bit message is repeated for the 6 second period. With each 60 bit message the timer T-1 is cycled through the sequence shown in table B of the Appendix. Since the timer T-1 input is derived from the decade counter only BCD counts 0–9 are shown.

Figure 5:
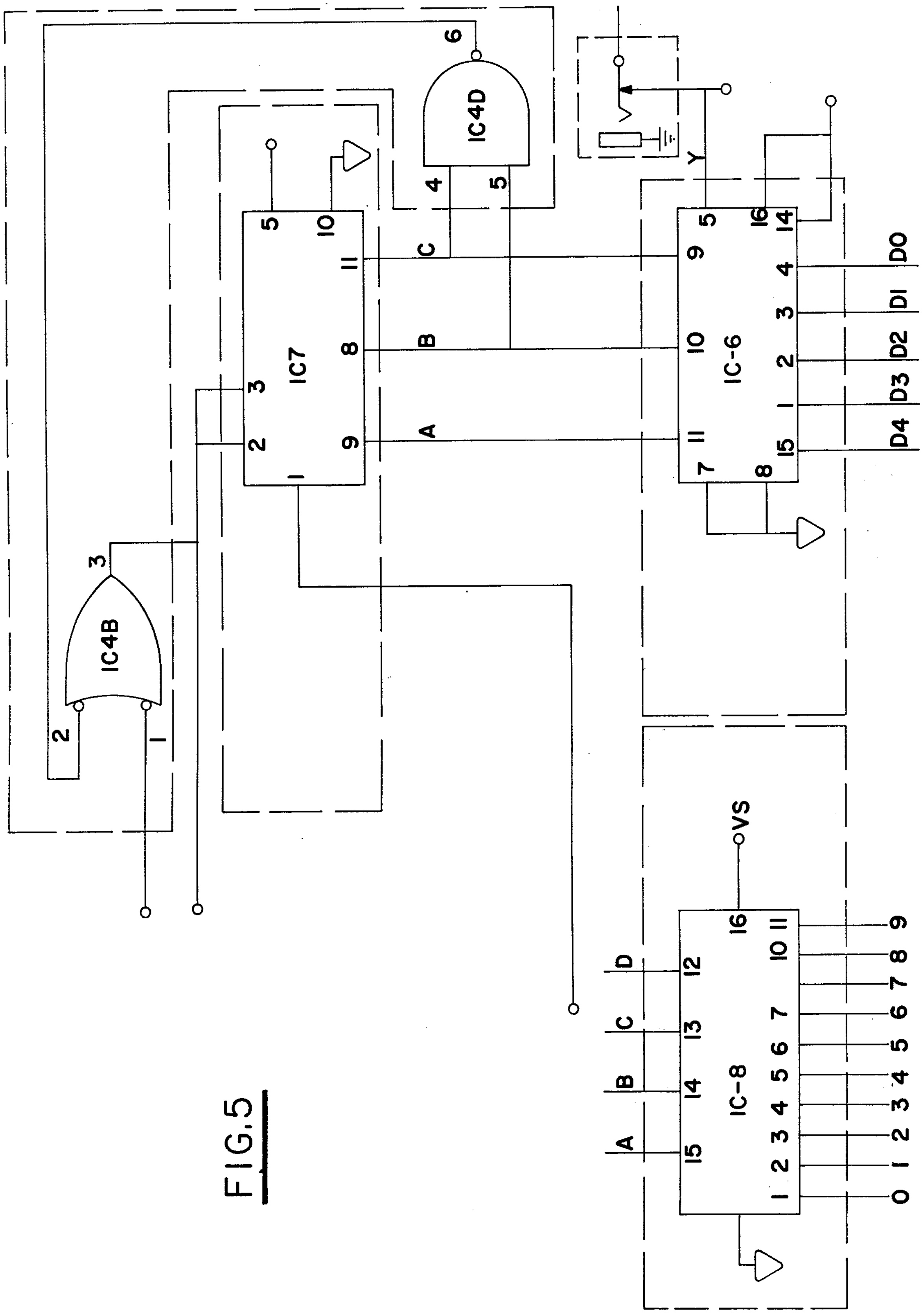
FIG. 5 is a schematic illustration of the reset gates 15, 3-bit counter 30, data selector 45, and the BCD-decimal decoder 40 of FIG. 1.

The 3-bit binary counter T-3 shown in circuit detail in FIG. 5. The T-3 output sequence is shown in the table C of Appendix. This counter is incremented one count each time the decade counter T-2 completes a count of 10 clock pulses. The 3-bit counter counts through the count of 5 during each transmission of the 60 bit message. The output waveforms at pins 12, 3, and 9 of T-1 are shown in FIG. 2.

The reset gates 15 of FIG. 1 resets the system at the completion of sending the 60 bit message and conditions the circuits to repeat the message for the 6 second period — until the 6 second timer times out and power is removed. In this embodiment the 60 bit message is repeated approximately 10 times during the 6 second period.

Referring again to FIG. 5 when the 3 bit binary counter T-3 reaches the count of 6, the B and C outputs are both at logic 1. This causes the positive nand gate 1C 4D output at its pin 6 to switch from logic 1 to logic 0. After the initial ½ second timer time-out, one input to the positive nand gate 1c4B is at logic 1. The other input is at logic 1 until the output of 1C4D at pin 6 swithces to logic 0 (as described above). When this occurs the output of 1C4B at pin 3 switches to logic 1 and resets the decade counter T-2 and 3-bit binary counter T-3 to count 0 and the message is initiated again. The output of timer 1C7 at its pin 9 is shown in FIG. 2.

With continued reference to FIG. 5 the outputs of pins 9, 8, and 11 as A, B, and C are applied to the timer 1C6 as binary inputs. The outputs at pins 15 (D4), 1 (D3), 2 (D2), 3 (D4), 4 (DO), and 14 (D5) sequence is shown in table D of the Appendix. The output at pin 5 (*y*) is also given. The logic X is intended to denote that the state may be either logic 1 or logic 0.

Figure 7:
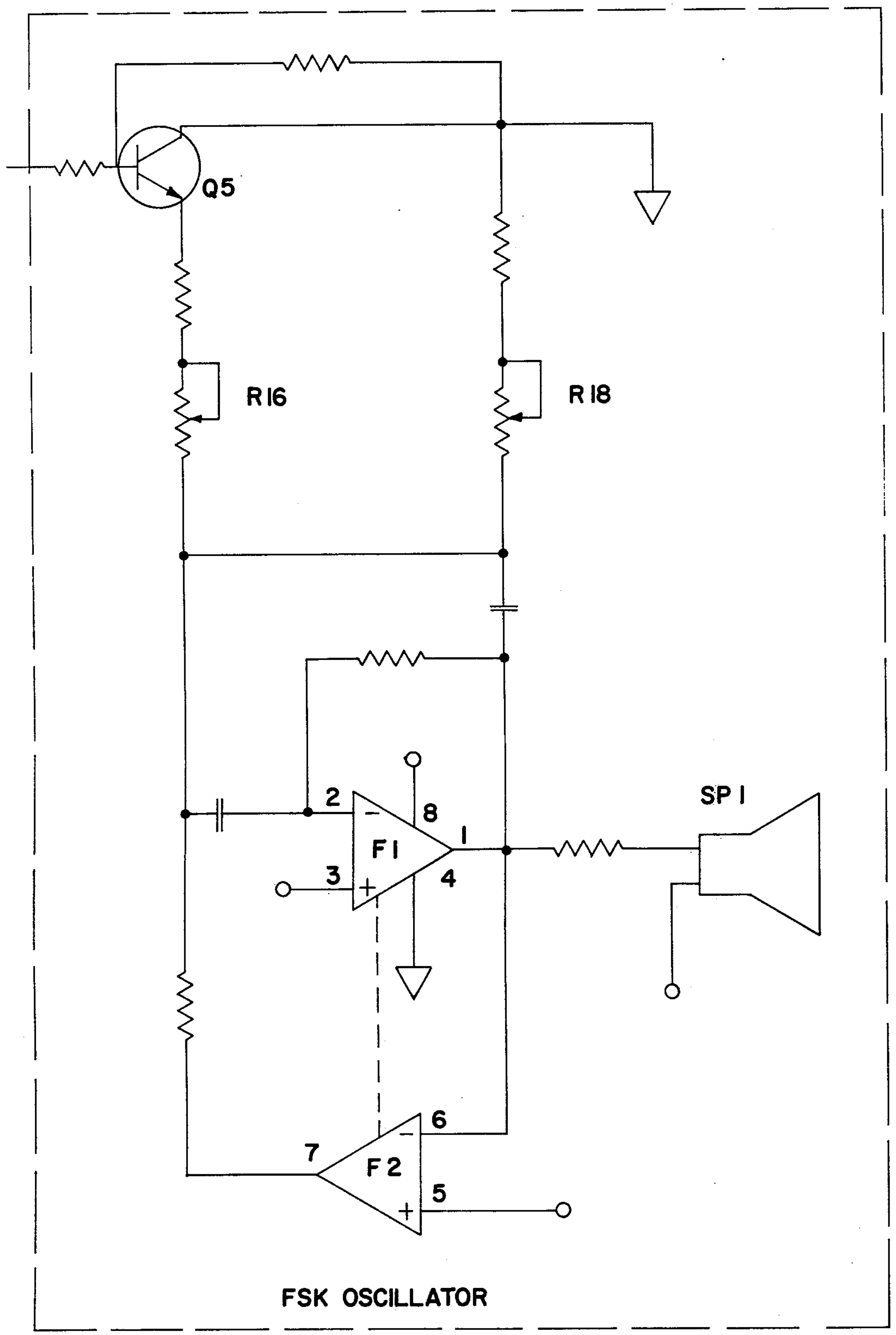
FIG. 7 is a schematic illustration of the message selection switches 60 of FIG. 1.

With reference now to FIG. 7 the FSK oscillator is shown in circuit detail. As stated above this oscillator generates the audio tone that is transmitted. The output frequency is 180° out of phase with the input frequency. The frequency is determined — in a conventional manner by the circuit component values. The output of the filter F-1 stage at pin 1 is limited, inverted, by limiter/inverter L-1, and fed back via pin 7 to the input at pin 2 of F-1. This in turn causes the circuit to oscillate. The acoustic speaker Sp-1 transmits the audio tone to the telephone handset microphone. The Sp-1 is driven by the output at pin 1 of oscillator (filter) F-l.

When the DATA selector (1C6) output (*y*) is at logic 1, transistor Q5 is on and transmits the mark frequency (1270 Hz). When the DATA SELECTOR (I-6) output (*y*) is at logic 0, Q5 is off and the unit transmits the space frequency (1070 Hz). Potentiometer R18 determines the 1070 hz frequency and potentiometer R16 in parallel with R18 determines the 1270 hz frequency.

Figure 6:
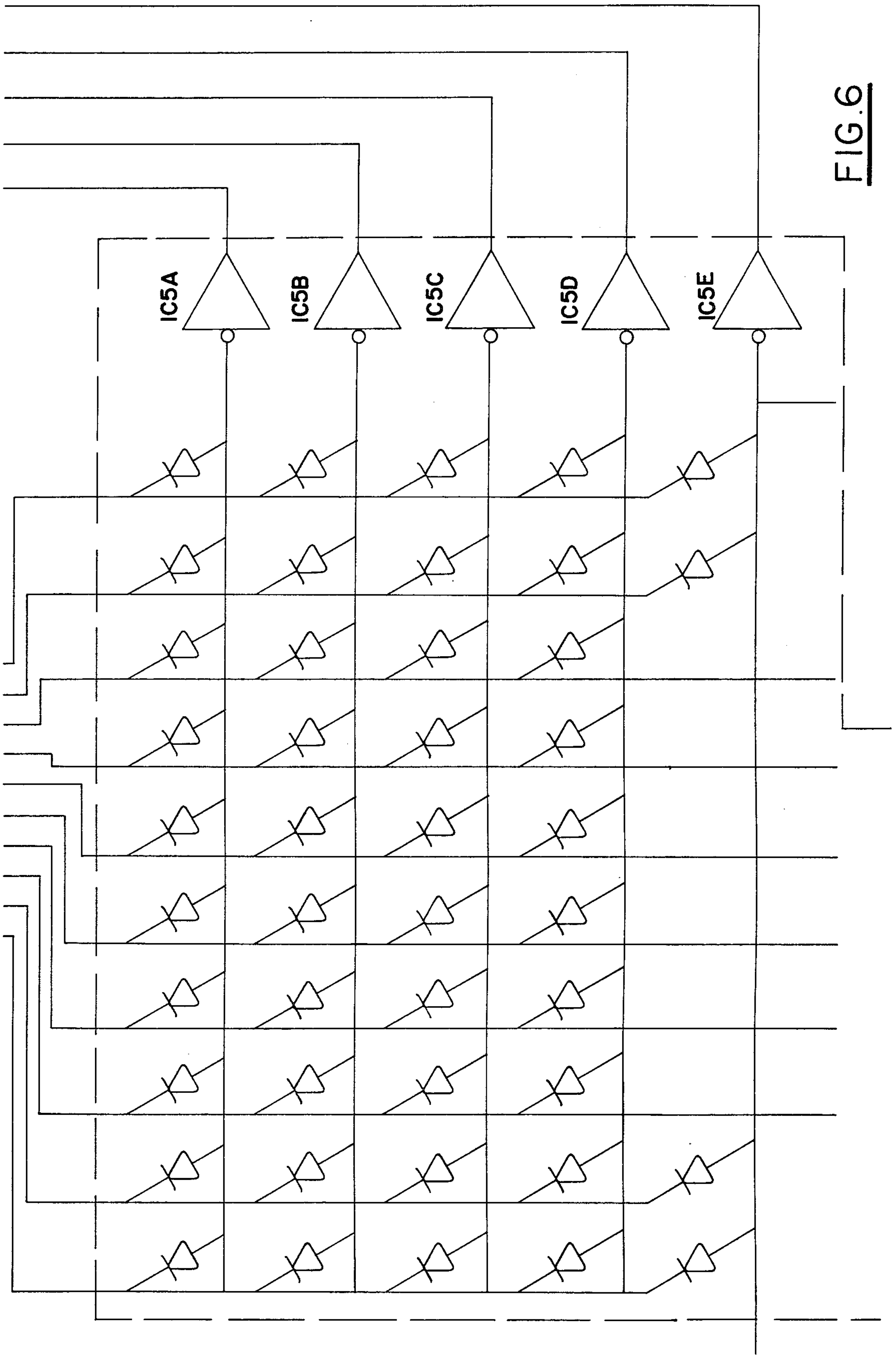
FIG. 6 is a schematic illustration of the diode matrix 65 of FIG. 1.

The diode matrix is shown in circuit detail in FIG. 6. The DIODE MATRIX determines the bit pattern within the 60 bit message. As can be seen from the tables for A, B. C and of the Appendix only one vertical column of diodes within the matrix is grounded during each count of the clock and only one horizontal row of diodes is connected to the DATA SELECTOR (T-6) through inverter (L-1) during each 10 clock pulses. If a diode is present at any particular position in the diode matrix the input to the selected L-1 inverter will be grounded (logic 0) which causes the output to be at +5 volts d.c. (logic 1). By referring to the table C for the DATA SELECTOR (T-6) it can be seen that a logic 1 will appear at the output (*y*) causing the mark frequency (1270 hz) to be transmitted.

If a diode is not present at any particular position a logic 0 will be present causing the space frequency (1070) to be transmitted. Bits 0, 1, 8–49 of the message are programmed by either removing diodes (logic 0's ) or leaving diodes in the matrix (logic 1's ).

Bits 49–59 of the 60 bit message are logic 1 because the D5 input to the DATA SELECTOR (IC6) is connected to +5 volts d.c.

Figure 8:
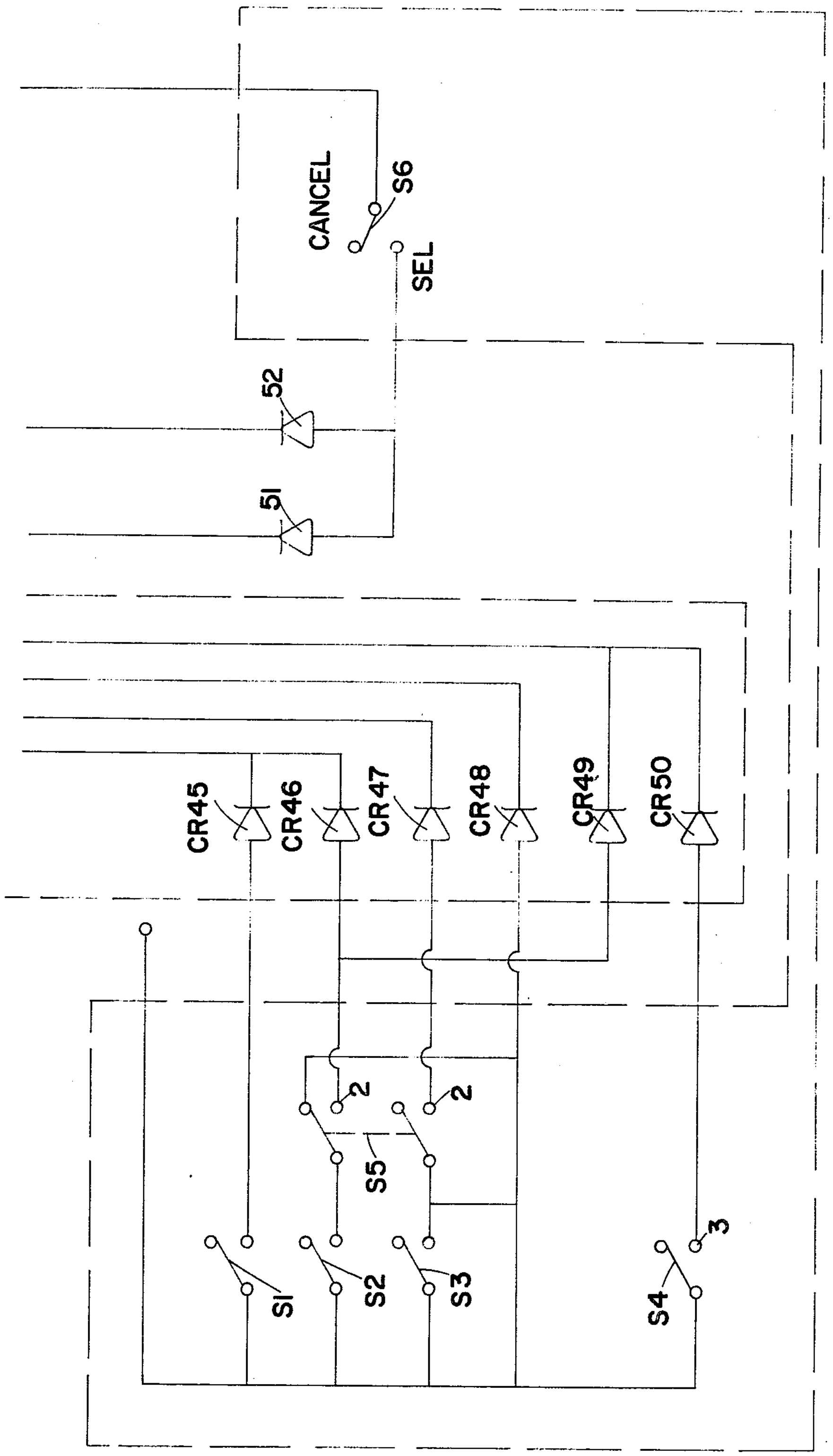
FIG. 8 is a schematic illustration of the FSK oscillator.

To allow for programming of the required message, selection switches 60 of FIG. 1 are provided. These switches are shown schematically in detail also in FIG. 8. Bits 2–7 of the 60 bit message are controlled by the six pushbutton switches located on the front panel of the unit. Switches S1, S5 and S4 are mechanically interlocked so that only one switch may be activated at a time. Switches S2 and S3 are also mechanically interlocked. Switch S6 will latch in either the ON or OFF position and is independant of the other switches. In the table E of the Appendix 0 refers to switch open circuit and 1 refers to switch closed circuit.

The phone jack 50 shown in FIG. 1 and is to permit interface to auxiliary coded message generators.

APPENDIX

DECADE COUNTER (IC2)
TRUTH TABLE A

| COUNT No. | CLOCK | A | B | C | D |
|---|---|---|---|---|---|
| 0 | 0 | 0 | 0 | 0 | 0 |
| 1 | 1 | 1 | 0 | 0 | 0 |
| 2 | 0 | 0 | 1 | 0 | 0 |
| 3 | 1 | 1 | 1 | 0 | 0 |
| 4 | 0 | 0 | 0 | 1 | 0 |
| 5 | 1 | 1 | 0 | 1 | 0 |
| 6 | 0 | 0 | 1 | 1 | 0 |
| 7 | 1 | 1 | 1 | 1 | 0 |
| 8 | 0 | 0 | 0 | 0 | 1 |
| 9 | 1 | 1 | 0 | 0 | 1 |

1. Logic 1 = +5VDC, Logic 0 = OVDC
2. Assume reset input at OVDC for above TRUTH TABLE. When reset is at +5VDC counter held at count 0.

TRUTH TABLE B

| BCD INPUTS | | | | DECIMAL OUTPUTS | | | | | | | | | |
|---|---|---|---|---|---|---|---|---|---|---|---|---|---|
| D | C | B | A | 0 | 1 | 2 | 3 | 4 | 5 | 6 | 7 | 8 | 9 |
| 0 | 0 | 0 | 0 | 0 | 1 | 1 | 1 | 1 | 1 | 1 | 1 | 1 | 1 |
| 0 | 0 | 0 | 1 | 1 | 0 | 1 | 1 | 1 | 1 | 1 | 1 | 1 | 1 |
| 0 | 0 | 1 | 0 | 1 | 1 | 0 | 1 | 1 | 1 | 1 | 1 | 1 | 1 |
| 0 | 0 | 1 | 1 | 1 | 1 | 1 | 0 | 1 | 1 | 1 | 1 | 1 | 1 |
| 0 | 1 | 0 | 0 | 1 | 1 | 1 | 1 | 0 | 1 | 1 | 1 | 1 | 1 |
| 0 | 1 | 0 | 1 | 1 | 1 | 1 | 1 | 1 | 0 | 1 | 1 | 1 | 1 |
| 0 | 1 | 1 | 0 | 1 | 1 | 1 | 1 | 1 | 1 | 0 | 1 | 1 | 1 |
| 0 | 1 | 1 | 1 | 1 | 1 | 1 | 1 | 1 | 1 | 1 | 0 | 1 | 1 |
| 1 | 0 | 0 | 0 | 1 | 1 | 1 | 1 | 1 | 1 | 1 | 1 | 0 | 1 |
| 1 | 0 | 0 | 1 | 1 | 1 | 1 | 1 | 1 | 1 | 1 | 1 | 1 | 0 |

1. Logic "1" = +5VDC, Logic "0" = OVDC
2. Only BCD counts 0–9 are shown since its input is derived from the DECADE COUNTER.

3 BIT BINARY COUNTER (IC7)

TRUTH TABLE C

| COUNT No. | INPUT | OUTPUTS C | B | A |
|---|---|---|---|---|
| 0 | 0 | 0 | 0 | 0 |
| 1 | 1 | 0 | 0 | 1 |
| 2 | 0 | 0 | 1 | 0 |
| 3 | 1 | 0 | 1 | 1 |
| 4 | 0 | 1 | 0 | 0 |
| 5 | 1 | 1 | 0 | 1 |
| 6 | 0 | 1 | 1 | 0 |

1. Logic "1" = +5VDC, Logic "0" = OVDC
2. Assume reset input at OVDC for TRUTH TABLE. When reset is at +5VDC IC7 is held at count 0.

DATA SELECTOR (IC6)

TRUTH TABLE D

| BINARY INPUTS | | | DATA INPUTS $D_0$ | $D_1$ | $D_2$ | $D_3$ | $D_4$ | $D_5$ | DATA OUTPUTS Y |
|---|---|---|---|---|---|---|---|---|---|
| 0 | 0 | 0 | 0 | X | X | X | X | X | 0 |
| 0 | 0 | 0 | 1 | X | X | X | X | X | 1 |
| 0 | 0 | 1 | X | 0 | X | X | X | X | 0 |
| 0 | 0 | 1 | X | 1 | X | X | X | X | 1 |

-continued

DATA SELECTOR (IC6)

TRUTH TABLE D

| BINARY INPUTS | | | DATA INPUTS $D_0$ | $D_1$ | $D_2$ | $D_3$ | $D_4$ | $D_5$ | DATA OUTPUTS Y |
|---|---|---|---|---|---|---|---|---|---|
| 0 | 1 | 0 | X | X | 0 | X | X | X | 0 |
| 0 | 1 | 0 | X | X | 1 | X | X | X | 1 |
| 0 | 1 | 1 | X | X | X | 0 | X | X | 0 |
| 0 | 1 | 1 | X | X | X | 1 | X | X | 1 |
| 1 | 0 | 0 | X | X | X | X | 0 | X | 0 |
| 1 | 0 | 0 | X | X | X | X | 1 | X | 1 |
| 1 | 0 | 1 | X | X | X | X | X | 1 | 1 |

1. Logic "1" = +5VDC. Logic "0" = OVDC
2. "X" means state may be either Logic 1 or Logic 0.

TRUTH TABLE E

| BITS 7 | 6 | 5 | 4 | 3 | 2 | PROGRAM 1 | SWITCH PATTERN S6 | S1 | S2 | S5 | S3 | S4 |
|---|---|---|---|---|---|---|---|---|---|---|---|---|
| 1 | 1 | 0 | 0 | 1 | 1 | 1 select | 1 | 1 | 0 | 0 | 1 | 0 |
| 1 | 1 | 0 | 1 | 0 | 1 | 2 select | 1 | 1 | 1 | 0 | 0 | 0 |
| 1 | 1 | 0 | 1 | 1 | 0 | 3 select | 1 | 0 | 0 | 1 | 1 | 0 |
| 1 | 1 | 1 | 0 | 0 | 1 | 4 select | 1 | 0 | 1 | 1 | 0 | 0 |
| 1 | 1 | 1 | 0 | 1 | 0 | 5 select | 1 | 0 | 0 | 0 | 1 | 1 |
| 1 | 1 | 1 | 1 | 0 | 0 | 6 select | 1 | 0 | 1 | 0 | 0 | 1 |
| 0 | 0 | 0 | 0 | 1 | 1 | 1 cancel | 0 | 1 | 0 | 0 | 1 | 0 |
| 0 | 0 | 0 | 1 | 0 | 1 | 2 cancel | 0 | 1 | 1 | 0 | 0 | 0 |
| 0 | 0 | 0 | 1 | 1 | 0 | 3 cancel | 0 | 0 | 0 | 1 | 1 | 0 |
| 0 | 0 | 1 | 0 | 0 | 1 | 4 cancel | 0 | 0 | 1 | 1 | 0 | 0 |
| 0 | 0 | 1 | 0 | 1 | 0 | 5 cancel | 0 | 0 | 0 | 0 | 1 | 1 |
| 0 | 0 | 1 | 1 | 0 | 0 | 6 cancel | 0 | 0 | 1 | 0 | 0 | 1 |

I claim:

1. A programmable acoustic transmitter operable to transmit a repeated digital message over conventional telephone lines into a digital computer using audio frequency-shift-keying transmission techniques, comprising:

- a first timing circuit operable to apply power to said transmitter for a fixed period of time,
- a clock generator for generating a predetermined bit per second baud rate with logic clock pulses,
- a decade counter having said clock pulses connected thereto,
- a decimal decoder having the two state logic pulses from said decade counter connected thereto,
- a 3-bit binary counter incremented one count per 10 clock pulses of said decade counter,
- a diode matrix,
- a data selector having said 3-bit binary counter and said diode matrix connected thereto to generate said mark signal and a space signal,
- an oscillator connected to the output of said data selector to generate a frequency signal indicative of a mark and a space signal for transmission on said telephone lines,
- said diode matrix having the outputs of said decimal decoder connected thereto for determining the bit pattern of said transmission having a first vertical column of diodes grounded during each count of said clock and a horizontal row of diodes connected to said data selector during ten of each of said clock pulses,
- a plurality of switches connected to said diode matrix for programming certain ones of said bits,
- reset means for resetting said counters.

2. The transmitter of claim 1 further comprises a very short duration timer for transmitting a proper connection signal over said telephone lines.

3. The transmitter of claim 1 wherein said first timing circuit is for a 6 second duration and wherein said repeated bit message is a 60 bit message repeated for the duration of said 6 seconds.

4. The transmitter of claim 1 wherein said clock further includes a one cycle generator operable to generate signals at the rate of 100 bps baud rate.

5. The generator of claim 4 having an output on alternate one-half cycles of a first and second logic signals.

6. The transmitter of claim 3 wherein said reset means comprises reset gates for resetting said circuits at the completion of each 60 bit message during said 6 second time period.

7. The transmitter of claim 1 wherein certain of said 60 bits are programmed in said diode matrix and certain of said diodes are fixed.

8. The transmitter of claim 7 wherein said programmed bits are bits 2-7 which are programmed by said switches, bits 0, 1, 8–49 are programmed by said diode matrix, and bits 49–59 are fixed.

9. The transmitter of claim 1 wherein said plurality of switches has certain switches mechanically interlocked to activate only one switch at a time.

* * * * *